United States Patent
Yi et al.

(10) Patent No.: US 11,190,977 B2
(45) Date of Patent: Nov. 30, 2021

(54) METHOD FOR HANDLING DATA LOSSLESS IN A UM RLC ENTITY IN WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Geumsan Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 16/633,457

(22) PCT Filed: Sep. 21, 2018

(86) PCT No.: PCT/KR2018/011295
§ 371 (c)(1),
(2) Date: Jan. 23, 2020

(87) PCT Pub. No.: WO2019/066427
PCT Pub. Date: Apr. 4, 2019

(65) Prior Publication Data
US 2020/0236588 A1  Jul. 23, 2020

Related U.S. Application Data

(60) Provisional application No. 62/564,241, filed on Sep. 27, 2017.

(51) Int. Cl.
*H04W 28/04* (2009.01)
*H04W 76/34* (2018.01)
*H04W 80/02* (2009.01)

(52) U.S. Cl.
CPC ........... *H04W 28/04* (2013.01); *H04W 76/34* (2018.02); *H04W 80/02* (2013.01)

(58) Field of Classification Search
CPC ...... H04W 28/04; H04W 76/34; H04W 80/02
See application file for complete search history.

(56) References Cited

U.S. PATENT DOCUMENTS

2010/0165937 A1  7/2010  Yi et al.
2017/0048922 A1  2/2017  Lee et al.
(Continued)

FOREIGN PATENT DOCUMENTS

KR  1020150137064  12/2015

OTHER PUBLICATIONS

Wang Huahua, Zhao Zhongxuan, "Research and Realization of RLC Layer Unacknowledged Mode in LTE System", IEEE, 2013 (Year: 2013).*

(Continued)

*Primary Examiner* — Habte Mered
(74) *Attorney, Agent, or Firm* — Lee Hong Degerman Kang & Waimey

(57) ABSTRACT

The present invention relates to a wireless communication system. More specifically, the present invention relates to a method and a device for handling data lossless in a UM RLC entity in wireless communication system, the method comprising: receiving a Radio Resource Control (RRC) message for releasing or reestablishing of a Unacknowledged Mode (UM) Radio Link Control (RLC) entity; transmitting, by the UM RLC entity to a Packet Data Convergence Protocol (PDCP) entity associated with the UM RLC entity, information for transmission status of RLC Service Data Units (SDUs) stored in the UM RLC entity; and discarding all RLC SDUs and Unacknowledged Mode Data (UMD) Protocol Data Units (PDUs) stored in the UM RLC entity.

16 Claims, 10 Drawing Sheets

(56) References Cited

U.S. PATENT DOCUMENTS

2017/0111945 A1     4/2017  Yi et al.
2018/0083688 A1*    3/2018  Agiwal .............. H04W 12/033
2018/0249375 A1*    8/2018  Goldhamer .......... H04L 1/1812
2020/0205024 A1*    6/2020  Jiang ................... H04W 76/27

OTHER PUBLICATIONS

TS 38.322 v1.0.0 , IEEE, Sep. 3, 2017 (Year: 2017).*
PCT International Application No. PCT/KR2018/011295, Notification of Transmittal of The International Search Report and the Written Opinion of the International Searching Authority, or Declaration dated Jan. 8, 2019, 15 pages.
Sequans Communications, "Transmitting UM RLC entity re-establishment", 3GPP TSG RAN WG2 Meeting #99bis, R2-1711655, Oct. 2017, 2 pages.

* cited by examiner (a) Control-Plane Protocol Stack (b) User-Plane Protocol Stack (a) Control-Plane Protocol Stack (b) User-Plane Protocol Stack

METHOD FOR HANDLING DATA LOSSLESS IN A UM RLC ENTITY IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/ 011295, filed on Sep. 21, 2018, which claims the benefit of U.S. Provisional Application No. 62/564,241, filed on Sep. 27, 2017, the contents of which are all hereby incorporated by reference herein in their entirety.

TECHNICAL FIELD

The present invention relates to a wireless communication system and, more particularly, to a method for handling data lossless in a UM RLC entity in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/ UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for handling data lossless in UM RLC entity in wireless communication system.

In LTE, PDCP data recovery is performed when the bearer type is changed (e.g., from MCG split bearer to MCG bearer). This is because, when the bearer type is changed from split to non-split bearer, one of the RLC entity is released, and the released RLC entity may have RLC SDUs stored in the RLC buffer. The PDCP data recovery procedure preventing packet loss of those RLC SDUs by retransmitting them via still existing RLC entity. However, UM DRB is not configured for split bearer, and thus the PDCP data recovery is not defined for UM DRB.

In NR or eLTE, the UM DRB can be also configured for split bearers. However, RAN2 has not discussed whether the PDCP data recovery should be also defined for UM DRB. In fact, the UM DRB is usually configured with the real-time application (e.g., VoIP, video streaming). Thus, it may not be useful to retransmit the PDCP PDUs as the retransmitted PDCP PDUs may be discarded in the receiver side due to delay requirement. In addition, the application using UM DRB is typically error-tolerant, and loss of some packets does not have big impacts on overall QoS.

Thus there should be a mechanism to recover data loss for UM DRBs different from the PDCP data recovery performed in AM DRB, when the bearer type is changed from split bearer to non-split bearer.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, it is possible to reduce data loss without retransmitting all PDCP PDUs in the UM RLC entity suitable for real-time applications.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
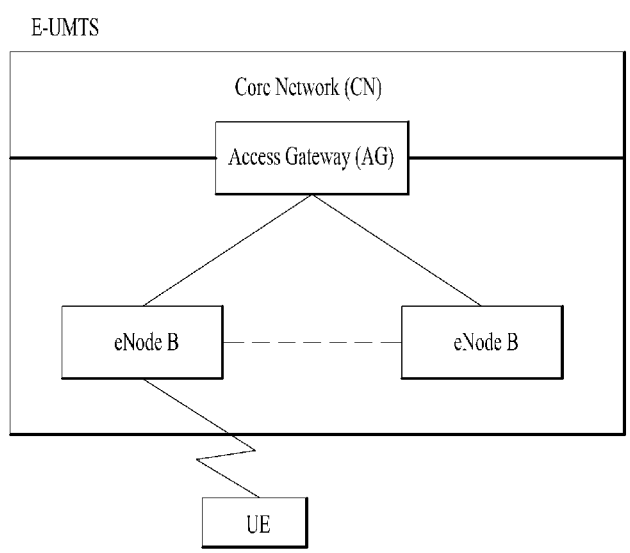
FIG. 1 is a diagram showing a network structure of an Evolved Universal Mobile Telecommunications System (E-UMTS) as an example of a wireless communication system.
Figure 2A:
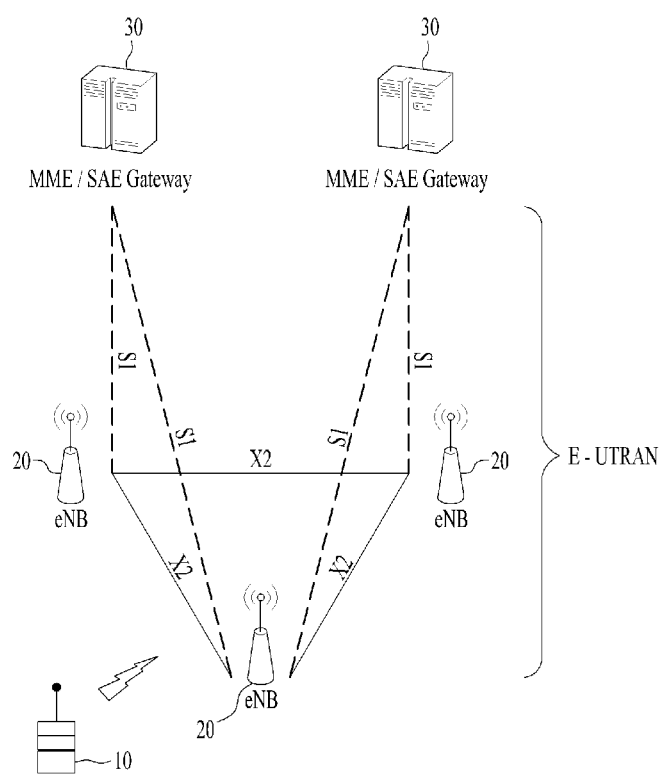
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
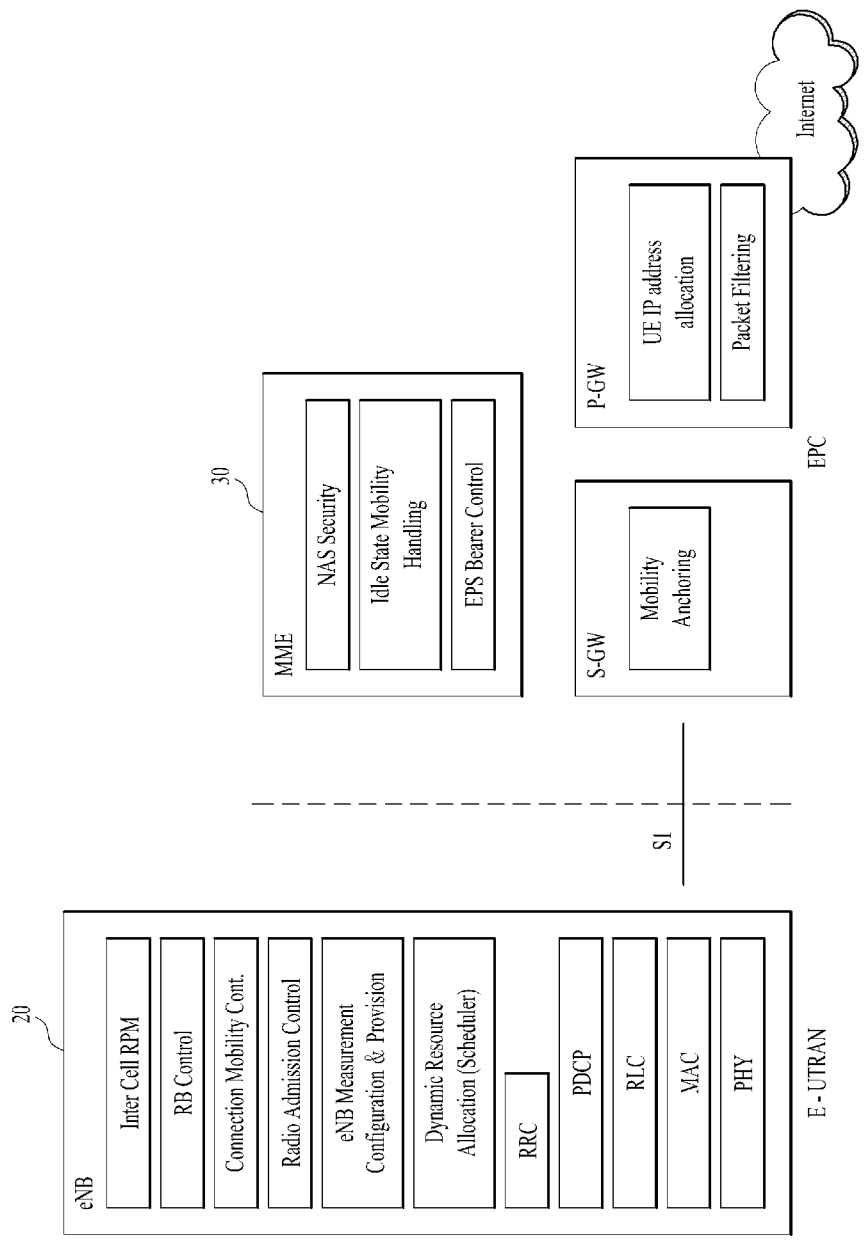
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2b, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
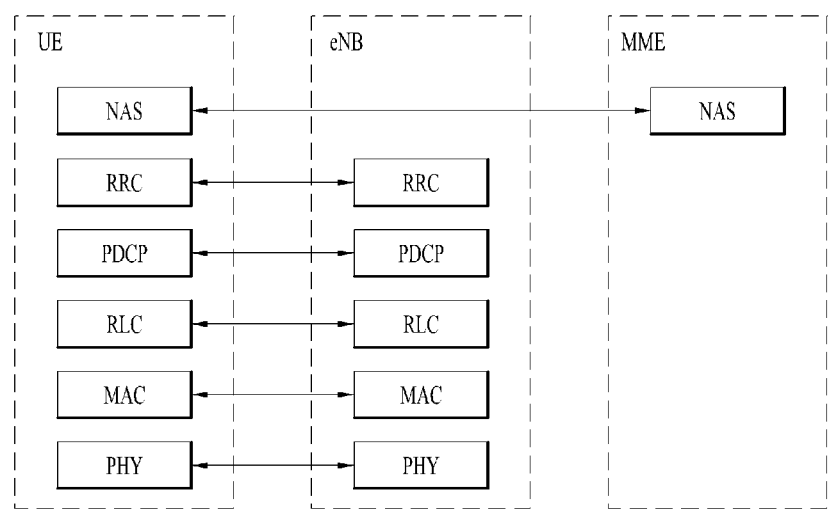
FIG. 3 is a diagram showing a control plane and a user plane of a radio interface protocol between a UE and an E-UTRAN based on a 3rd generation partnership project (3GPP) radio access network standard.
Figure 3:
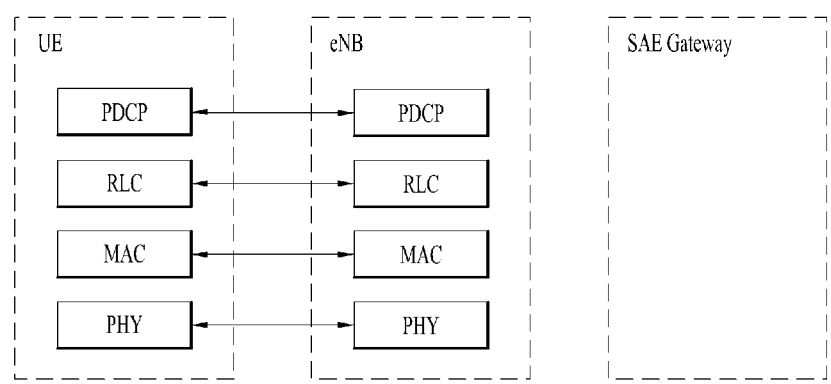

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
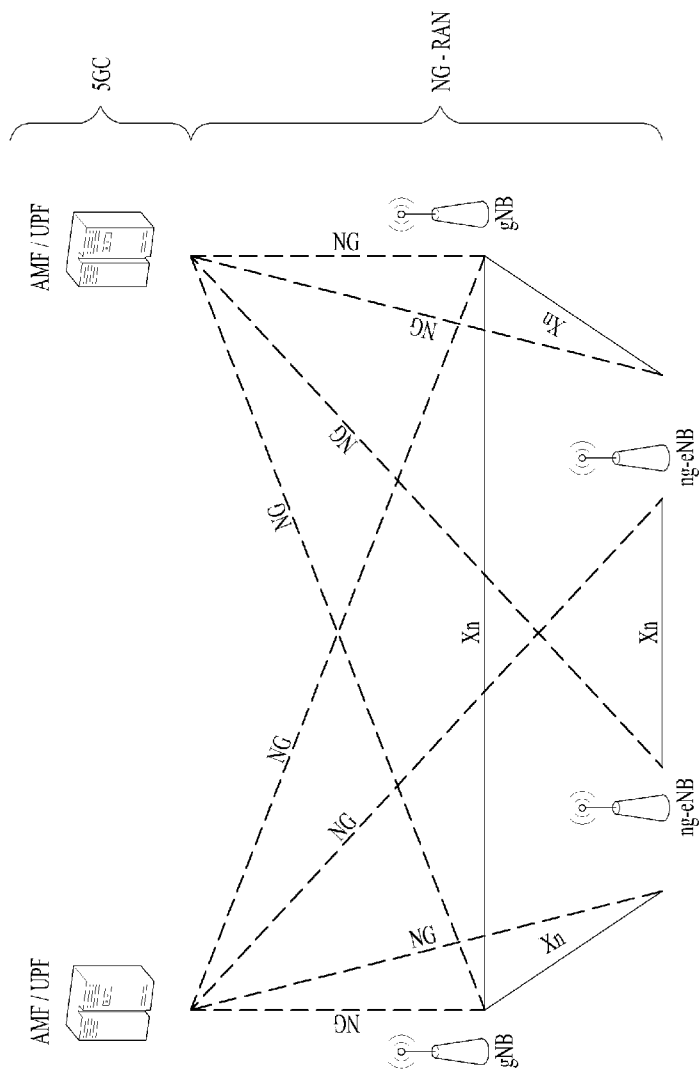
FIG. 4a is a block diagram illustrating network structure of NG Radio Access Network (NG-RAN) architecture.
Figure 4B:
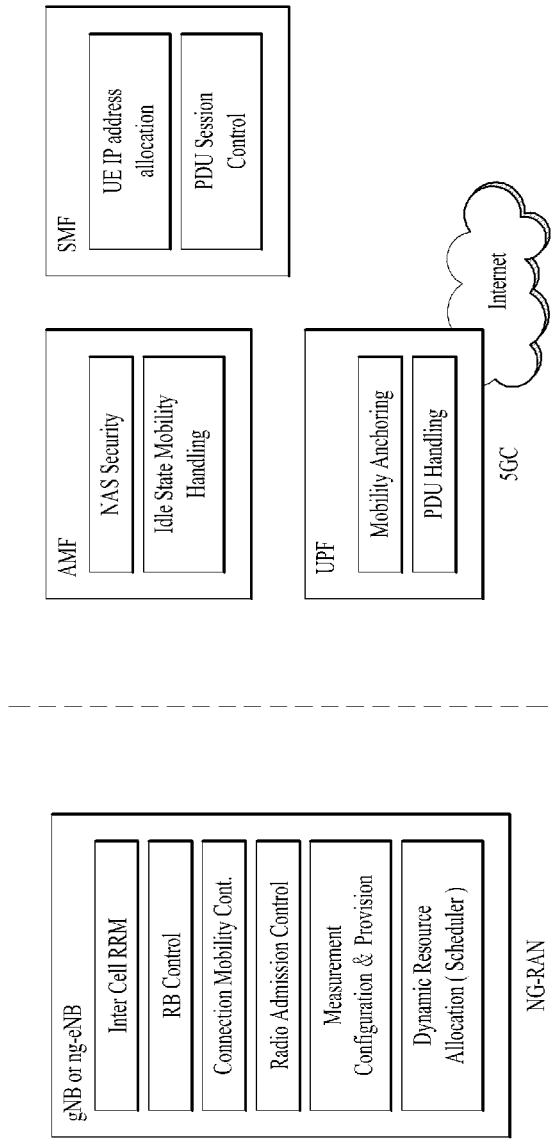
FIG. 4b is a block diagram depicting architecture of functional Split between NG-RAN and 5G Core Network (5GC)

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
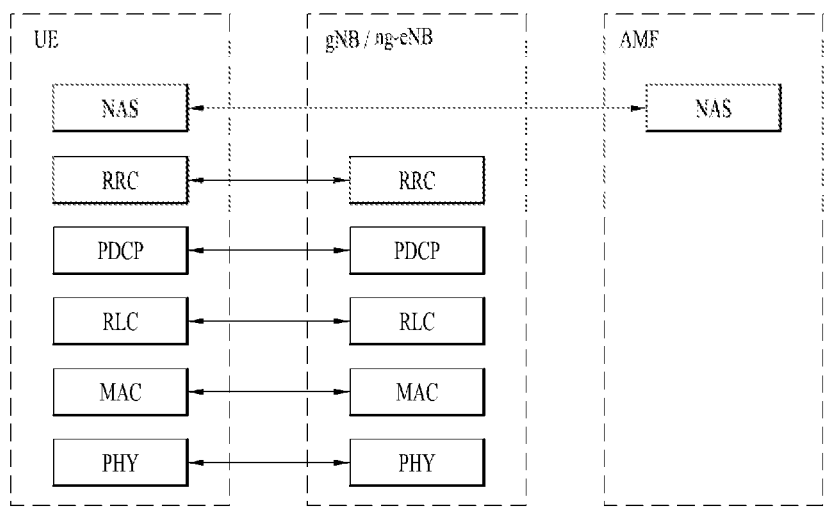
FIG. 5 is a diagram showing a control plane and a user plane of a radio interface protocol between a UE and a NG-RAN based on a 3rd generation partnership project (3GPP) radio access network standard.
Figure 5:
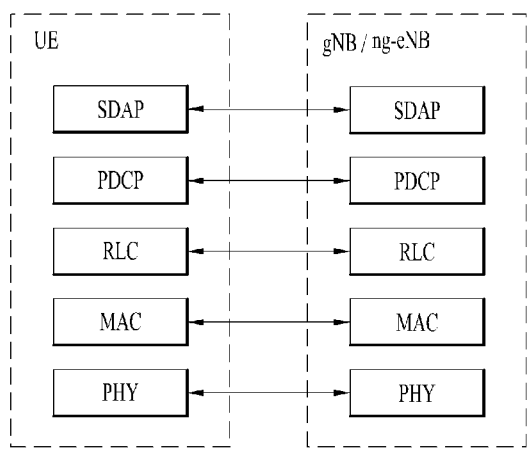

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
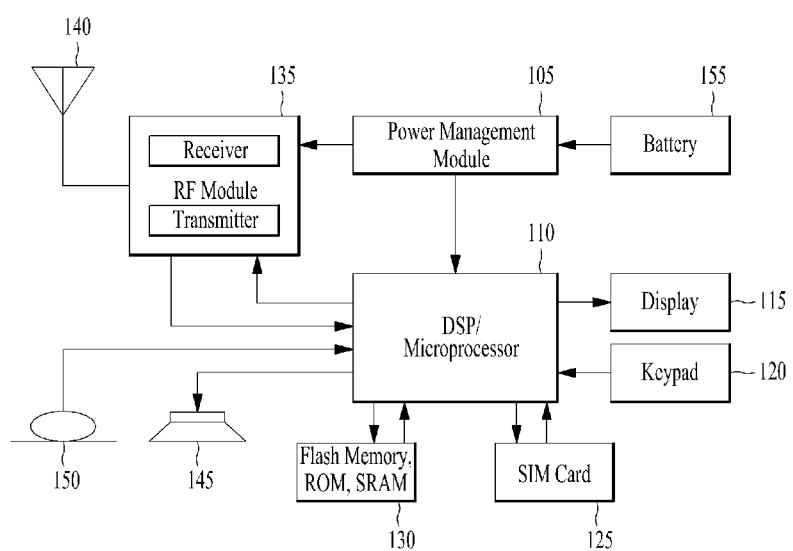
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7:
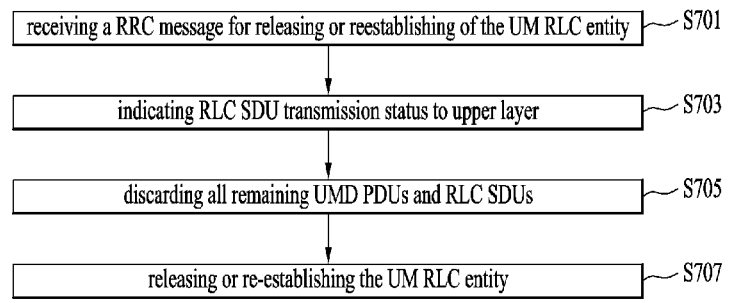
FIG. 7 is a conceptual diagram for handling data lossless in a transmitting UM RLC entity in wireless communication system according to embodiments of the present invention.

FIG. 7 is a conceptual diagram for handling data lossless in UM RLC entity in wireless communication system according to embodiments of the present invention.

In LTE, PDCP data recovery is performed, when the bearer type is changed. For example, the situations of bearer type change include: i) if the concerned entry of drb-ToAddModList includes the drb-TypeLWA set to FALSE (i.e. LWA to LTE only DRB) in LWA specific DRB addition or reconfiguration, or ii) if the DRB indicated by drb-Identity is a split DRB in SCG reconfiguration, or iii) release of LWA configuration.

When the bearer type is changed from split to non-split bearer, one of the RLC entity is released, and the released RLC entity may have RLC SDUs stored in the RLC buffer. The PDCP data recovery procedure preventing packet loss of those RLC SDUs by retransmitting them via still existing RLC entity.

When upper layers request a PDCP Data Recovery for a radio bearer, the UE compiles a PDCP status report, and submit it to lower layers as the first PDCP PDU for the transmission if the radio bearer is configured by upper layers to send a PDCP status report in the uplink, and performs retransmission of all the PDCP PDUs previously submitted to re-established AM RLC entity in ascending order of the associated COUNT values from the first PDCP PDU for which the successful delivery has not been confirmed by lower layers.

In NR, when the DBR is reconfigured and if recover PDCP is set, the UE triggers the PDCP entity of this DRB to perform data recovery. However, the PDCP data recovery is only configured for AM DRBs in NR.

In the prior art, since the split bearer is configured only for AM RLC entity, the PDCP data recovery is needed in AM RLC entity due to retransmission. In NR or eLTE, the split bearer can be configured for UM RLC entity as well. In the case of UM RLC entity, retransmission of PDCP PDUs may be unnecessary because the UM RLC entity is suitable for real-time application.

Therefore, we think the PDCP data recovery procedure is not essential for UM DRBs, and propose not to define the PDCP data recovery procedure for UM DRBs. Without the PDCP data recovery procedure, the PDCP entity of UM DRB considers that the PDCP PDUs submitted to the UM RLC entity are successfully transmitted.

The invention is that when a UM RLC entity is released or the UM RLC entity is re-established, the UM RLC entity transmits information for indicating to a PDCP entity associated with the UM RLC entity the transmission status of RLC SDUs that were stored in the UM RLC entity.

This method is that the released or re-established UM RLC entity considers the RLC SDUs submitted to lower layer as "successfully transmitted" and the RLC SDUs not submitted to lower layer as "not successfully transmitted", and transmits information for indicating this result to the PDCP entity. Then, based on the RLC indication, the PDCP entity retransmits the "not successfully transmitted" PDCP PDUs to another UM RLC entity.

More specifically, the transmitting side of UM RLC entity receives a RRC message for releasing or reestablishing of the UM RLC entity (S701).

Preferably, the RRC message for releasing of the UM RLC entity can be a RRC message for reconfiguration of radio bearer. For example, reconfiguration of radio bearer includes the bearer type change from a split bearer (i.e. 1 PDCP entity is mapped to 2 RLC entities) to non-split bearer (i.e. 1 PDCP entity is mapped to 1 RLC entity).

When the transmitting side of UM RLC entity is receives the RRC message for releasing or reestablishing of the UM RLC entity, the UM RLC entity transmits information for indicating RLC SDU transmission status to upper layer (S703).

Preferably, the upper layer can be a PDCP entity or a RRC entity or a NAS layer.

Preferably, the information for transmission status of RLC SDUs includes information whether a RLC SDU has been transmitted or not for each RLC SDU stored in the UM RLC entity, or information for RLC SDUs not transmitted yet, or information for RLC SDUs already transmitted.

The UM RLC entity considers that 'a RLC SDU is transmitted' if any byte of a RLC SDU is submitted to a lower layer (e.g. MAC entity), or all bytes of the RLC SDU are submitted to a lower layer, or any byte of a RLC SDU is mapped to a RLC PDU, or all bytes of the RLC SDU are mapped to one or more RLC PDUs.

The UM RLC entity considers that 'a RLC SDU is not transmitted' if any byte of a RLC SDU is not submitted to a lower layer (e.g. MAC entity), or all bytes of the RLC SDU are not submitted to a lower layer, or any byte of a RLC SDU is not mapped to a RLC PDU, or all bytes of the RLC SDU are not mapped to one or more RLC PDUs.

The examples of indicating the transmission status of the RLC SDUs will be described in detail below with reference to FIG. 8.

After transmitting information for indicating RLC SDU transmission status to upper layer, the UM RLC entity discards all remaining UMD PDUs and RLC SDUs (S705).

Further, the UM RLC entity is released when the RRC message indicates the release of the UM RLC entity, or the UM RLC entity is re-established when the RRC message indicates the re-establishment of the UM RLC entity (S707).

When the upper layer entity (e.g. PDCP entity) of the UM RLC entity receives the RLC SDU transmission status from the UM RLC entity, the upper layer entity of the UM RLC entity may retransmit not transmitted packets (same as not transmitted RLC SDUs).

Thus, if the PDCP entity is associated with another RLC entity than the released UM RLC entity, the PDCP entity retransmits RLC SDUs whose transmission status is indicated as not transmitted by the released UM RLC entity to the another RLC entity.

Or, if the PDCP entity is associated with the reestablished UM RLC entity, the PDCP entity retransmits RLC SDUs whose transmission status is indicated as not transmitted by the reestablished UM RLC entity to the reestablished UM RLC entity.

The proposed method is implemented by a transmitting device. The transmission device can be a user equipment (UE) or a base station, shown in FIG. 6, but it can be any apparatus for performing the same operation.

As shown in FIG. 6, the transmitting device may comprises a DSP/microprocessor (110) and RF module (transceiver; 135). The DSP/microprocessor (110) is electrically connected with the transceiver (135) and controls it.

Specifically, FIG. 6 may represent a UE comprising a receiver (135), and a transmitter (135). These receiver and the transmitter can constitute the transceiver (135). The UE further comprises a processor (110) operably coupled with the transmitter and the receiver (135: receiver and transmitter). The processor (110) is configured to receive, via the receiver, a RRC message for releasing or reestablishing of a UM RLC entity; transmit information for transmission status of RLC SDUs stored in the UM RLC entity to the upper layer, and discard all RLC SDUs and UMD PDU stored in the UM RLC entity.

Also, FIG. 6 may represent a network apparatus comprising a receiver (135), and a transmitter (135). These transmitter and receiver may constitute the transceiver (135). The network further comprises a processor (110) operably coupled with the transmitter and the receiver (135: receiver and transmitter). The processor (110) is configured to trigger releasing or reestablishing of a UM RLC entity; transmit information for transmission status of RLC SDUs stored in the UM RLC entity to the upper layer, and discard all RLC SDUs and UMD PDU stored in the UM RLC entity.

Figure 8:
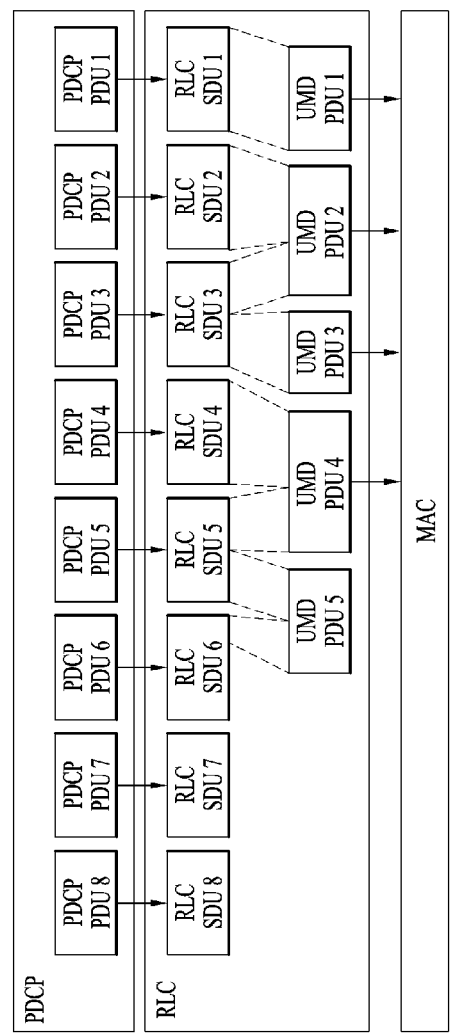
FIG. 8 is examples for indicating transmission status of RLC SDUs in UM RLC entity in wireless communication system according to embodiments of the present invention.

FIG. 8 is examples for indicating transmission status of RLC SDUs in UM RLC entity in wireless communication system according to embodiments of the present invention.

It is assumed that the PDCP entity submits the PDCP PDUs (from 1 to 8) to the RLC layer, and the UM RLC entity processes the RLC SDUs (from 1 to 6) to generate UMD PDUs (from 1 to 5).

The MAC entity request the UM RLC entity to submit UMD PDUs to the MAC entity (the total size of UMD PDUs that should be submitted is indicated), and the RLC entity submits the UMD PDUs (from 1 to 4) to lower layer (see FIG. 8).

The UM RLC entity receives a RRC message for releasing or reestablishing of the UM RLC entity, and the UM RLC entity indicates RLC SDU transmission status to upper layer (i.e. PDCP entity).

For a case 1, if the UM RLC entity considers that an RLC SDU is transmitted when any byte of a RLC SDU is submitted to a lower layer:

If RLC SDU transmission status indicates whether the RLC SDU has been transmitted or not, the UM RLC entity indicates to the PDCP entity RLC SDUs 1, 2, 3, 4, and 5 as "transmitted" and RLC SDUs 6, 7, and 8 as "not transmitted".

If RLC SDU transmission status indicates the RLC SDUs not transmitted yet, the UM RLC entity indicates to the PDCP entity RLC SDUs 6, 7, and 8 as "not transmitted".

If RLC SDU transmission status indicates the RLC SDUs already transmitted, the UM RLC entity indicates to the PDCP entity RLC SDU 1, 2, 3, 4, and 5 as "transmitted".

For a case 2, if the UM RLC entity considers that an RLC SDU is transmitted when all bytes of the RLC SDU are submitted to a lower layer:

If RLC SDU transmission status indicates whether the RLC SDU has been transmitted or not, the UM RLC entity indicates to the PDCP entity RLC SDUs 1, 2, 3, and 4 as "transmitted" and RLC SDUs 5, 6, 7, and 8 as "not transmitted".

If RLC SDU transmission status indicates the RLC SDUs not transmitted yet, the UM RLC entity indicates to the PDCP entity RLC SDUs 5, 6, 7, and 8 as "not transmitted".

If RLC SDU transmission status indicates the RLC SDUs already transmitted, the UM RLC entity indicates to the PDCP entity RLC SDUs 1, 2, 3, and 4 as "transmitted".

For a case 3, if the UM RLC entity considers that an RLC SDU is transmitted when any byte of a RLC SDU is mapped to a RLC PDU:

If RLC SDU transmission status indicates whether the RLC SDU has been transmitted or not, the UM RLC entity indicates to the PDCP entity RLC SDUs 1, 2, 3, 4, 5, and 6 as "transmitted" and RLC SDUs 7 and 8 as "not transmitted".

If RLC SDU transmission status indicates the RLC SDUs not transmitted yet, the UM RLC entity indicates to the PDCP entity RLC SDUs 7, and 8 as "not transmitted".

If RLC SDU transmission status indicates the RLC SDUs already transmitted, the UE UM RLC entity indicates to the PDCP entity RLC SDUs 1, 2, 3, 4, 5, and 6 as "transmitted".

For a case 4, if the UM RLC entity considers that an RLC SDU is transmitted when all bytes of the RLC SDU is mapped to one or more RLC PDUs:

If RLC SDU transmission status indicates whether the RLC SDU has been transmitted or not, the UM RLC entity indicates to the PDCP entity RLC SDUs 1, 2, 3, 4 and 5 as "transmitted" and RLC SDUs 6, 7, and 8 as "not transmitted".

If RLC SDU transmission status indicates the RLC SDUs not transmitted yet, the UM RLC entity indicates to the PDCP entity RLC SDUs 6, 7, and 8 as "not transmitted".

If RLC SDU transmission status indicates the RLC SDUs already transmitted, the UM RLC entity indicates to the PDCP entity RLC SDUs 1, 2, 3, 4, and 5 as "transmitted"

After indicating according to the above methods, the UE releases or re-establishes the UM RLC entity after discarding all RLC SDUs and UMD PDUs stored in the UM RLC entity.

If the PDCP entity is associated with another RLC entity than the released UM RLC entity, the PDCP entity retransmits the PDCP PDUs whose transmission status is indicated as "not transmitted" by the released UM RLC entity to the another RLC entity.

Or if the PDCP entity is associated with the reestablished UM RLC entity, the PDCP entity retransmits RLC SDUs whose transmission status is indicated as not transmitted by the reestablished UM RLC entity to the reestablished UM RLC entity.

Preferably, the RLC indication including information for transmission status of RLC SDUs of the step of S703 is different from status report or HARQ feedback.

In fact, if PDCP PDUs re-transmission is also needed for UM DRBs, there are 3 options to discuss based on which information the PDCP entity retransmits the PDCP PDUs.

First option can be status report (e.g. PDCP status report). Since the status report is sent by the peer PDCP entity, and it requires at least one round-trip time, retransmission of PDCP PDUs (or RLC SDUs) based on status report may take longer time than the delay requirement.

Second option can be HARQ feedback. Since the HARQ feedback is provided per MAC PDU, and one MAC PDU is composed of multiple RLC PDUs, the UE has to keep track of the mapping between PDCP PDU and MAC PDU, which is quite complex for UE implementation to identify the transmission status of each PDCP PDU.

Third option is the RLC indication including information for transmission status of RLC SDUs (or PDCP PDUs), such as we proposed.

For AM DRBs, the AM RLC entity can identify the transmission status of each RLC SDU based on the RLC status report. The PDCP entity can retransmit the not successfully transmitted PDCP PDUs based on the RLC status report. However, there is no RLC status report defined and it cannot be used for PDCP data recovery for UM DRBs.

The third option is that the released or re-established UM RLC entity considers the RLC SDUs submitted to lower layer as "successfully transmitted" and the RLC SDUs not submitted to lower layer as "not successfully transmitted", and indicates this result to the PDCP entity. Then, based on the RLC indication, the PDCP entity retransmits the "not successfully transmitted" PDCP PDUs to another UM RLC entity. This is the simplest among these options.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a transmitting device operating in a wireless communication system, the method comprising:
receiving a Radio Resource Control (RRC) message for releasing or reestablishing of a Unacknowledged Mode (UM) Radio Link Control (RLC) entity;
transmitting, by the UM RLC entity to a Packet Data Convergence Protocol (PDCP) entity associated with the UM RLC entity, information for transmission status of RLC Service Data Units (SDUs) stored in the UM RLC entity; and
discarding all RLC SDUs and Unacknowledged Mode Data (UMD) Protocol Data Units (PDUs) stored in the UM RLC entity,
wherein the UM RLC entity is released when the RRC message includes information for the release of the UM RLC entity, and
wherein the UM RLC entity is re-established when the RRC message includes information for the re-establishment of the UM RLC entity.

2. The method according to claim 1, wherein when a bearer type for the UM RLC entity is changed from a split bearer to non-split bearer, the UM RLC entity is released.

3. The method according to claim 1, wherein the information for transmission status of RLC SDUs includes one of following:
information whether a RLC SDU has been transmitted or not for each RLC SDU stored in the UM RLC entity, or
information of RLC SDUs not transmitted yet, or
information of RLC SDUs already transmitted.

4. The method according to claim 3, wherein a RLC SDU whose transmission status is indicated as transmitted by the UM RLC entity is:
a RLC SDU of which any byte is submitted to a lower layer,
a RLC SDU of which all bytes are submitted to a lower layer,
a RLC SDU of which any byte is mapped to a RLC PDU, or
a RLC SDU of which all bytes are mapped to one or more RLC PDUs.

5. The method according to claim 3, wherein a RLC SDU whose transmission status is indicated as not transmitted by the UM RLC entity is:
a RLC SDU of which any byte is not submitted to a lower layer,
a RLC SDU of which all bytes are not submitted to a lower layer,
a RLC SDU of which any byte is not mapped to a RLC PDU, or
a RLC SDU of which all bytes are not mapped to one or more RLC PDUs.

6. The method according to claim 5, wherein if the PDCP entity is associated with another RLC entity than the released UM RLC entity, the PDCP entity retransmits RLC SDUs whose transmission status is indicated as not transmitted by the released UM RLC entity to the another RLC entity.

7. The method according to claim 5, wherein if the PDCP entity is associated with the reestablished UM RLC entity, the PDCP entity retransmits RLC SDUs whose transmission status is indicated as not transmitted by the reestablished UM RLC entity to the reestablished UM RLC entity.

8. A transmitting device for operating in a wireless communication system, the transmitting device comprising:
a transmitter and a receiver; and
a processor operably coupled with the transmitter and the receiver and configured to:
receive a Radio Resource Control (RRC) message for releasing or reestablishing of a Unacknowledged Mode (UM) Radio Link Control (RLC) entity;
transmit, by the UM RLC entity to a Packet Data Convergence Protocol (PDCP) entity associated with the UM RLC entity, information for transmission status of RLC Service Data Units (SDUs) stored in the UM RLC entity; and
discard all RLC SDUs and Unacknowledged Mode Data (UMD) Protocol Data Units (PDUs) stored in the UM RLC entity, wherein the UM RLC entity is released when the RRC message includes information for the release of the UM RLC entity, wherein the UM RLC entity is re-established when the RRC message includes information for the re-establishment of the UM RLC entity.

9. The transmitting device according to claim 8, wherein when a bearer type for the UM RLC entity is changed from a split bearer to non-split bearer, the UM RLC entity is released.

10. The transmitting device according to claim 8, wherein the information for transmission status of RLC SDUs includes one of following:
   information whether a RLC SDU has been transmitted or not for each RLC SDU stored in the UM RLC entity, or
   information of RLC SDUs not transmitted yet, or
   information of RLC SDUs already transmitted.

11. The transmitting device according to claim 10, wherein a RLC SDU whose transmission status is indicated as transmitted by the UM RLC entity is:
   a RLC SDU of which any byte is submitted to a lower layer,
   a RLC SDU of which all bytes are submitted to a lower layer,
   a RLC SDU of which any byte is mapped to a RLC PDU, or
   a RLC SDU of which all bytes are mapped to one or more RLC PDUs.

12. The transmitting device according to claim 10, wherein a RLC SDU whose transmission status is indicated as not transmitted by the UM RLC entity is:
   a RLC SDU of which any byte is not submitted to a lower layer,
   a RLC SDU of which all bytes are not submitted to a lower layer,
   a RLC SDU of which any byte is not mapped to a RLC PDU, or
   a RLC SDU of which all bytes are not mapped to one or more RLC PDUs.

13. The transmitting device according to claim 12, wherein if the PDCP entity is associated with another RLC entity than the released UM RLC entity, the PDCP entity retransmits RLC SDUs whose transmission status is indicated as not transmitted by the released UM RLC entity to the another RLC entity.

14. The transmitting device according to claim 12, wherein if the PDCP entity is associated with the reestablished UM RLC entity, the PDCP entity retransmits RLC SDUs whose transmission status is indicated as not transmitted by the reestablished UM RLC entity to the reestablished UM RLC entity.

15. The method according to claim 1, wherein the transmitting device is capable of communicating with at least one of another device, a device related to an autonomous driving vehicle, a base station and/or a network.

16. The transmitting device according to claim 8, wherein the transmitting device is capable of communicating with at least one of another device, a device related to an autonomous driving vehicle, a base station and/or a network.

\* \* \* \* \*